7120X

S. Batchelder.
Yarn Dressing Mach.

Patented Jun. 22, 1832.

N. PETERS, PHOTO-LITHOGRAPHER, WASHINGTON, D. C.

7120X June 22, 1832 67

Samuel Bachelder
Letters Patent

Figure 2:
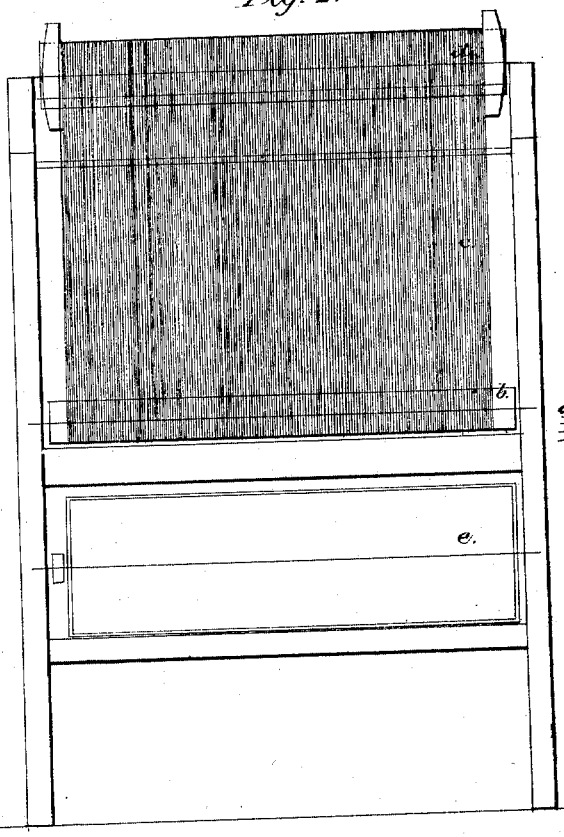
Figure 1:
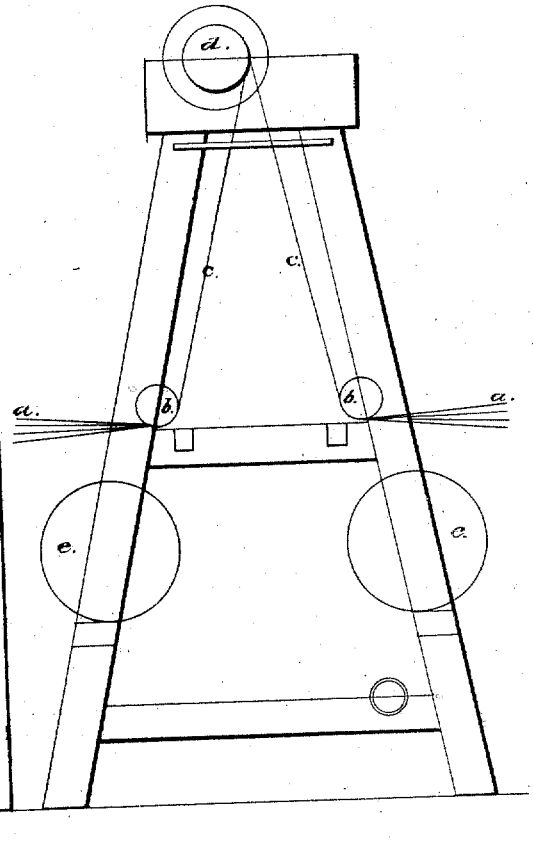

The Schedule referred to in these Letters Patent and mak-
ing part of the same containing a description in the words
of the said Samuel Bachelder himself of his im-
provement in the machinery for Dressing yarn pre-
paratory to weaving. Be it known that I Sam-
uel Bachelder of Saco in the State of Maine
have invented an improvement in the mode of dressing
yarn by which that preparatory operation in the business
of weaving is greatly facilitated & that the following is
a full and exact description of my said invention —
The accompanying drawing represents two vertical
sections of part of the dressing frame of the ordinary form
Fig 1. being a section thereof as seen end wise & Fig 2 a
side view a. a. represents the yarn in its course from
the sizing rolls and brushes. to the measuring rolls b. b.
from which it is drawn as represented at c. c. and
wound on to the beam d — The measuring rolls
are usually made half a yard in circumference
and as they revolve by the motion of the yarn. a clock
serves to indicate the quantity dressed. For the
purpose of drying the yarn it is common to employ
revolving fans running in boxes which boxes are shewn
at e. e. & sometimes a current of heated air is made
to blow upon it. By my invention the revolving
fans & the heated air are dispensed with. the yarn
effectually dried without their aid. For this
purpose I make my measuring rollers hollow or
I use separate drying rollers forming them of cop-
per or suitable substance. & cause steam or heated air
to be conducted thro' them by means of hollow gudgeons
in 7120X June 22, 1832 in the same way in which callender & other rollers
are sometimes heated. As the mode of doing this is
well known to those in the habit of constructing or
using such machinery it does not require to be de-
scribed by me. Altho' I consider steam as the most
convenient vehicle of heat in the above apparatus it
is manifest that hot water metallic heaters or oth-
er articles may be employed to heat the measuring
rollers. I do not therefore, intend to confine myself to
the use of steam exclusively, but what I claim as
my invention is the using of a cylinder of metal heated
by steam or other wise in the usual place of the meas-
uring rollers, or in any other situation where they can
be placed in contact with the yarn for the purpose
of drying it instead of or in conjunction with the fans
or heated air heretofore employed for that purpose —

Witnesses
John Shepley
John F. Hartley

Saml. Batchelder

Drawing

Exd
[illegible]

[528 [illegible]]